United States Patent
Steele

(10) Patent No.: US 11,358,786 B2
(45) Date of Patent: Jun. 14, 2022

(54) CONVEYING SYSTEMS

(71) Applicant: James Steele, Stillwater, MN (US)

(72) Inventor: James Steele, Stillwater, MN (US)

(73) Assignee: DYNAMIC AIR INC, St. Paul, MN (US)

( * ) Notice: Subject to any disclaimer, the term of this patent is extended or adjusted under 35 U.S.C. 154(b) by 1 day.

(21) Appl. No.: 16/974,168

(22) Filed: Oct. 28, 2020

(65) Prior Publication Data

US 2021/0047109 A1  Feb. 18, 2021

Related U.S. Application Data

(60) Continuation of application No. 16/602,919, filed on Dec. 23, 2019, now Pat. No. 10,882,690, which is a division of application No. 16/350,136, filed on Oct. 2, 2018, now Pat. No. 10,589,925, which is a division of application No. 15/732,564, filed on Nov. 28, 2017, now abandoned, which is a division of
(Continued)

(51) Int. Cl.

| | |
|---|---|
| *B65G 53/16* | (2006.01) |
| *B65D 88/70* | (2006.01) |
| *B65G 53/42* | (2006.01) |
| *B65G 53/66* | (2006.01) |
| *B65G 65/40* | (2006.01) |
| *B65G 53/10* | (2006.01) |
| *B65D 88/54* | (2006.01) |
| *B65G 3/04* | (2006.01) |
| *B65G 53/04* | (2006.01) |
| *B65D 88/26* | (2006.01) |

(52) U.S. Cl.
CPC ............ *B65D 88/703* (2013.01); *B65D 88/26* (2013.01); *B65D 88/54* (2013.01); *B65G 3/04* (2013.01); *B65G 53/04* (2013.01); *B65G 53/10* (2013.01); *B65G 53/42* (2013.01); *B65G 53/66* (2013.01); *B65G 65/40* (2013.01)

(58) Field of Classification Search
CPC .......... B65G 3/04; B65G 53/10; B65G 53/42; B65G 53/16; B65G 53/521; B65G 65/40; B65G 53/66; B65D 88/28; B65D 88/70; B65D 88/72; B65D 88/703; B65D 88/706; B65D 88/54; B65D 88/548
USPC ...... 406/11, 93, 73, 132, 133, 136, 137, 197; 222/195, 400.5
See application file for complete search history.

(56) References Cited

U.S. PATENT DOCUMENTS

| | | | | |
|---|---|---|---|---|
| 1,520,343 A | * | 12/1924 | Green ................. | B65D 88/70 222/192 |
| 2,170,258 A | * | 8/1939 | Borch ................. | B65D 88/72 222/202 |

(Continued)

*Primary Examiner* — Joseph A Dillon, Jr.
(74) *Attorney, Agent, or Firm* — Johnson & Phung

(57) ABSTRACT

A conveying system for conveying a conveyable material from a hopper where the system includes a fluid port located below the hopper outlet and in a vertical flow path into hopper outlet that can be momentarily opened for an on the go release of a charge of compressed air directly upward into the hopper outlet and into the underside of the bridge in the hopper to either disintegrate or unlock the bridged particles from each other thereby causing the bridged material to fall into the hopper outlet and into the conveying system where the material can be transported to a remote location or to remove any material that may be adhering to the wall during an emptying phase.

10 Claims, 4 Drawing Sheets

Related U.S. Application Data application No. 15/530,725, filed on Feb. 21, 2017, now Pat. No. 9,919,865, which is a division of application No. 14/756,043, filed on Jul. 24, 2015, now Pat. No. 9,650,206.

(56) References Cited

U.S. PATENT DOCUMENTS

| | | | | |
|---|---|---|---|---|
| 2,688,423 A * | 9/1954 | Davis | F16K 25/02 | 406/132 |
| 2,707,132 A * | 4/1955 | Baresch | B65G 53/12 | 406/14 |
| 2,915,339 A * | 12/1959 | Lusted | B65D 88/72 | 406/90 |
| 2,989,349 A * | 6/1961 | Hartley | G01F 13/001 | 406/142 |
| 3,088,776 A * | 5/1963 | Aller | B65D 88/548 | 406/119 |
| 3,149,884 A * | 9/1964 | Jones | B65G 53/58 | 406/138 |
| 3,155,287 A * | 11/1964 | Gist | B65D 88/72 | 406/142 |
| 3,178,233 A * | 4/1965 | Bredthauer | B65G 53/30 | 406/136 |
| 3,188,144 A * | 6/1965 | Gmur | B65B 1/28 | 406/23 |
| 3,195,775 A * | 7/1965 | Thomas | B65D 88/66 | 222/52 |
| 3,348,589 A * | 10/1967 | Krauss | B65D 88/72 | 141/284 |
| 3,407,972 A * | 10/1968 | Cymbalisty | B65G 65/44 | 222/196 |
| 3,432,208 A * | 3/1969 | Draper | B65G 53/22 | 406/93 |
| 3,604,758 A * | 9/1971 | Flain | B65G 53/00 | 406/50 |
| 3,788,527 A * | 1/1974 | Matson | B65D 88/703 | 222/195 |
| 3,840,155 A * | 10/1974 | Frye | B65D 90/626 | 222/195 |
| 3,915,339 A * | 10/1975 | Matson | B65D 88/703 | 222/3 |
| 3,942,684 A * | 3/1976 | Stetson | B65D 88/703 | 222/3 |
| 3,952,956 A * | 4/1976 | Steele | B08B 5/02 | 239/289 |
| 3,985,510 A * | 10/1976 | Taylor | B01D 53/34 | 422/172 |
| 4,014,462 A * | 3/1977 | Robertson | B29B 17/0005 | 222/136 |
| 4,036,408 A * | 7/1977 | Dugge | B65D 88/70 | 406/137 |
| 4,051,982 A * | 10/1977 | Stetson | B65D 88/703 | 222/195 |
| 4,134,466 A * | 1/1979 | Steele | G01G 21/22 | 177/114 |
| 4,197,966 A * | 4/1980 | Wadensten | B65D 88/703 | 222/1 |
| 4,223,044 A * | 9/1980 | Se | B65D 88/706 | 134/22.1 |
| 4,346,822 A * | 8/1982 | Wadensten | B65D 88/703 | 222/195 |
| 4,469,247 A * | 9/1984 | Tompkins | B65D 88/703 | 137/199 |
| 4,472,062 A * | 9/1984 | Balzau | B01F 13/0288 | 366/106 |
| 4,496,076 A * | 1/1985 | Tompkins | B65D 88/703 | 222/195 |
| 4,502,819 A * | 3/1985 | Fujii | B65G 53/66 | 406/132 |
| 4,560,094 A * | 12/1985 | Eales | B65G 53/22 | 222/195 |
| 4,662,759 A * | 5/1987 | Leibee | E01C 19/46 | 366/11 |
| 4,671,030 A * | 6/1987 | Krauss | B65D 88/72 | 52/197 |
| 4,676,402 A * | 6/1987 | Stetson | B65D 88/703 | 222/3 |
| 4,697,962 A * | 10/1987 | Dunbar | B65G 53/12 | 406/15 |
| 4,703,869 A * | 11/1987 | De Rooy | B65D 88/703 | 222/3 |
| 4,739,964 A * | 4/1988 | Hutt | B65D 88/706 | 251/63.6 |
| 4,767,024 A * | 8/1988 | Rappen | B65D 88/703 | 222/195 |
| 4,771,920 A * | 9/1988 | Boccagno | B29B 13/022 | 219/421 |
| 4,817,821 A * | 4/1989 | Simoens | F16K 31/363 | 222/3 |
| 4,826,051 A * | 5/1989 | Milian | B24C 7/0046 | 222/195 |
| 4,827,967 A * | 5/1989 | Junier | B01J 8/0025 | 137/240 |
| 4,836,499 A * | 6/1989 | Steele | F16K 1/228 | 251/173 |
| 4,880,148 A * | 11/1989 | Schmidt | B65D 88/72 | 222/195 |
| 5,071,289 A * | 12/1991 | Spivak | B65G 53/22 | 406/11 |
| 5,295,659 A * | 3/1994 | Steele | F16K 1/228 | 251/173 |
| 5,299,888 A * | 4/1994 | Wysong | B65G 65/46 | 406/67 |
| 5,441,171 A * | 8/1995 | Maury | B65D 88/703 | 222/3 |
| 5,678,959 A * | 10/1997 | Griffard | B65G 53/22 | 406/122 |
| 5,685,640 A * | 11/1997 | Goedicke | B01F 13/0255 | 222/195 |
| 5,740,660 A * | 4/1998 | Rowe | A61J 3/07 | 53/454 |
| 5,853,160 A * | 12/1998 | Hurdis | B65D 88/703 | 251/30.02 |
| 5,988,867 A * | 11/1999 | Sisk | B65G 53/16 | 222/195 |
| 6,007,234 A * | 12/1999 | Steele | B65D 88/706 | 239/533.14 |
| 6,321,939 B1 * | 11/2001 | Treat | F16K 17/0433 | 222/195 |
| 6,383,301 B1 * | 5/2002 | Bell | B01J 8/0015 | 118/716 |
| 6,662,953 B1 * | 12/2003 | Rouse | B65D 88/70 | 209/682 |
| 6,702,248 B2 * | 3/2004 | Treat | B65D 88/703 | 251/28 |
| 6,726,059 B2 * | 4/2004 | Treat | B65D 88/703 | 137/493.1 |
| 6,755,114 B2 * | 6/2004 | Onoe | B65G 53/14 | 91/275 |
| 6,802,685 B1 * | 10/2004 | Federhen | B65G 53/12 | 222/442 |
| 8,256,448 B2 * | 9/2012 | Steele | F16K 49/007 | 137/240 |
| 8,337,122 B2 * | 12/2012 | Schultz | B65G 53/46 | 406/146 |
| 8,387,824 B2 * | 3/2013 | Wietgrefe | B65D 90/00 | 222/1 |
| 8,439,236 B2 * | 5/2013 | Okabe | B65D 88/68 | 222/411 |
| 8,936,416 B2 * | 1/2015 | Stutz, Jr. | B24C 9/00 | 406/132 |
| 8,948,689 B2 * | 2/2015 | Simoens | B65D 88/703 | 455/15 |
| 8,967,919 B2 * | 3/2015 | Yaluris | B01J 8/0015 | 406/50 |
| 9,067,727 B2 * | 6/2015 | Roberts | B01D 21/20 | |
| 9,126,772 B2 * | 9/2015 | Marchesini | B01D 46/48 | |

(56) References Cited

U.S. PATENT DOCUMENTS

| | | | |
|---|---|---|---|
| 10,052,651 B2* | 8/2018 | Ramosevac | B65D 43/163 |
| 10,150,124 B2* | 12/2018 | Altin | B05B 7/1468 |
| 10,351,363 B2* | 7/2019 | Orban | B65G 65/425 |
| 10,525,490 B2* | 1/2020 | Altin | B05B 7/1477 |
| 10,654,646 B1* | 5/2020 | Lin | B65D 88/72 |
| 10,654,667 B2* | 5/2020 | Orban | B65G 65/425 |
| 10,752,451 B2* | 8/2020 | Baker | B65G 53/525 |
| 10,960,421 B2* | 3/2021 | Altin | B05B 14/48 |
| 2002/0137005 A1* | 9/2002 | Cevey | A61C 3/025 433/88 |
| 2003/0017012 A1* | 1/2003 | Onoe | B65D 88/66 406/108 |
| 2003/0132242 A1* | 7/2003 | Treat | B65D 88/703 222/4 |
| 2004/0156263 A1* | 8/2004 | McCann | F25C 5/24 366/299 |
| 2005/0151100 A1* | 7/2005 | Dalmasso | F16K 24/06 251/28 |
| 2008/0279641 A1* | 11/2008 | Critelli | B65D 88/703 406/137 |
| 2010/0322721 A1* | 12/2010 | Hamel | B65D 88/70 406/146 |
| 2010/0329797 A1* | 12/2010 | Gunther | B65D 88/72 405/233 |
| 2011/0000936 A1* | 1/2011 | Pronschinske | F41B 11/00 222/195 |
| 2013/0036954 A1* | 2/2013 | Hacker | C10J 3/50 110/229 |
| 2014/0270996 A1* | 9/2014 | Thiele | B65D 90/582 406/122 |
| 2016/0122138 A1* | 5/2016 | Mauchle | B65G 53/18 406/14 |
| 2016/0244254 A1* | 8/2016 | Marchesini | B65D 88/66 |
| 2016/0263610 A1* | 9/2016 | Sakita | B01D 46/04 |

* cited by examiner

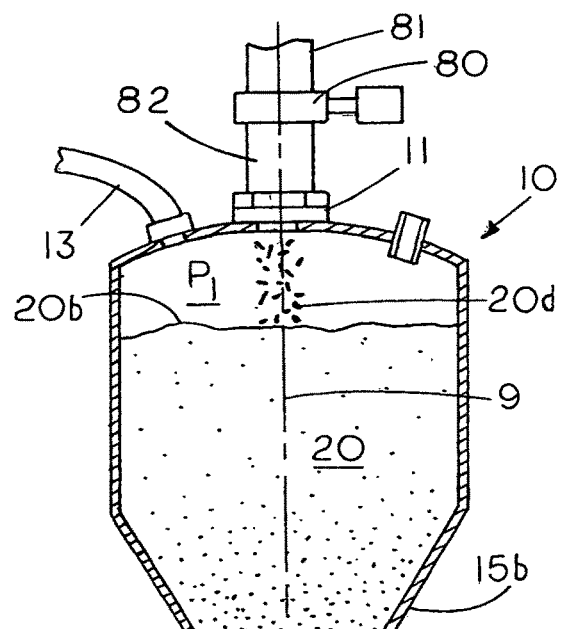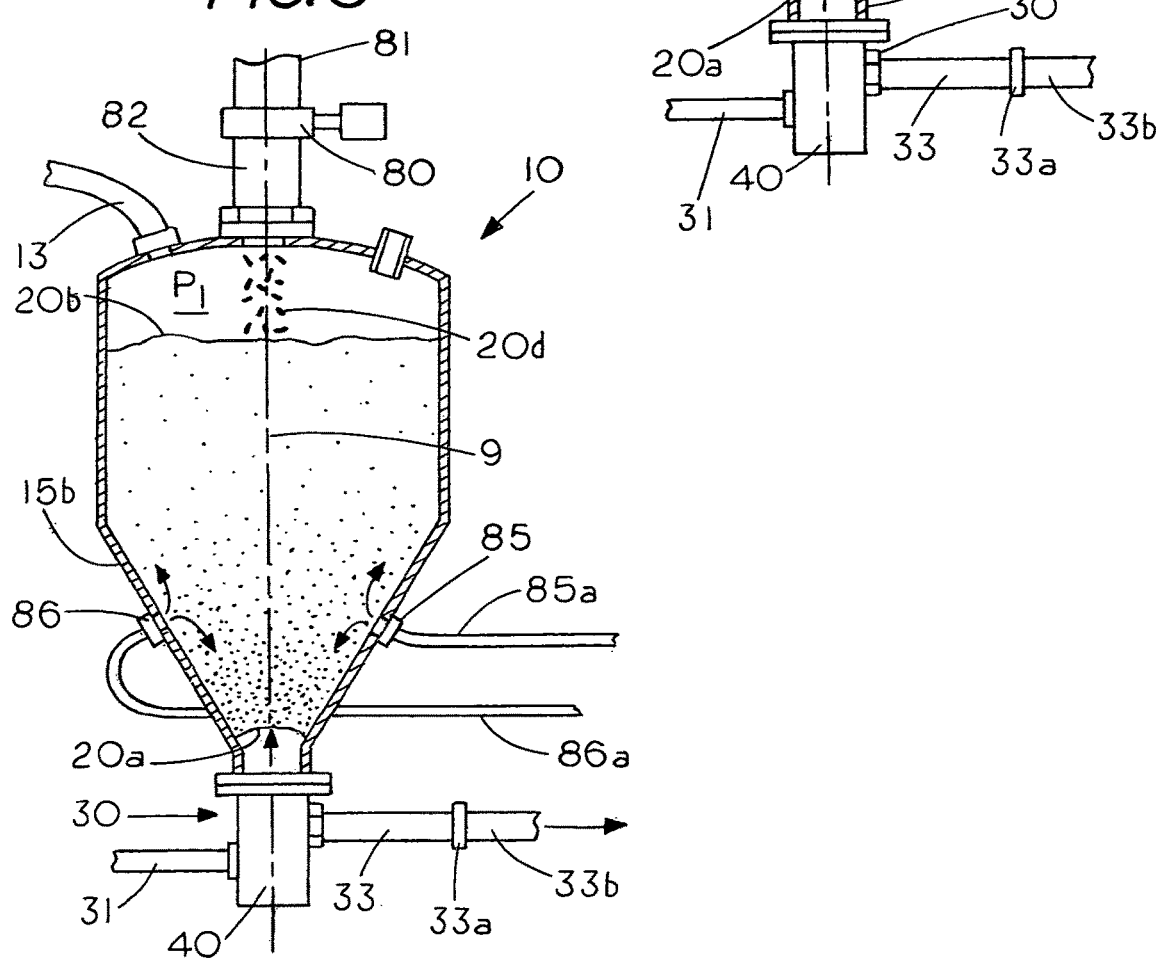

CONVEYING SYSTEMS

CROSS REFERENCE TO RELATED APPLICATIONS

This application is a continuation application of application Ser. No. 16/602,919 filed Dec. 23, 2019 (pending), which is a divisional application of application Ser. No. 16/350,136 filed Oct. 2, 2018 (now U.S. Pat. No. 10,589,925), which is a divisional application of application Ser. No. 15/732,564 filed Nov. 28, 2017 titled CONVEYING SYSTEM (abandoned), which is divisional application of application Ser. No. 15/530,725 filed Feb. 21, 2017 titled CONVEYING SYSTEM (now U.S. Pat. No. 9,919,865), which is a divisional application of application Ser. No. 14/756,043 filed Jul. 24, 2015 titled CONVEYING SYSTEM (now U.S. Pat. No. 9,650,206).

STATEMENT REGARDING FEDERALLY SPONSORED RESEARCH OR DEVELOPMENT

None

REFERENCE TO A MICROFICHE APPENDIX

None

BACKGROUND OF THE INVENTION

This invention relates generally to conveying systems and, more specifically, to a conveying system and a low energy method of maintaining a flow of conveyable material that is subject to bridging.

In conveying solid materials, which may comprise a variety of solid materials or particles, the conveyable materials are typically delivered to a gravity hopper, which contains a cone shaped base that directs the conveyable material to an outlet at the bottom of the gravity feeder. Typically, the outlet connects to a conveying line such as a pneumatic or mechanical conveying line, which conveys the material to a different location. One of the difficulties with delivering conveyable materials through a gravity hopper is that often times the particles of the conveyable materials may adhere to one another and form a self supporting bridge over the outlet in the gravity hopper thus preventing flow of the conveyable materials through the hopper outlet. Numerous devices and methods have been proposed to eliminate the tendency of the conveyable materials to form a material bridge in the hopper or to break up a bridge of conveyable material in the hopper.

U.S. Pat. No. 3,195,775 shows an example of a device that vibrates a hopper to break a material bridge in a hopper, unfortunately vibration of the hopper can prematurely decrease the life of the system as well as consume a large amount of energy.

U.S. patent publication 2003/0017012 shows an air knocker that is mounted on the side of a storage tank with the air knocker having an elastic sheet or diaphragm that attaches to the side of the storage tank for blasting pulsed air. A permanent magnet holds the valve in a closed state until the magnetic force is overcome, which enables one to blast air into the side of the storage tank or the bottom of the tank in order to fluidize the material in the tank. In one embodiment air is blasted past an elastic member that is mounted on the sidewall of the hopper.

U.S. Pat. Nos. 3,788,527, 4,767,024 and 4,496,076 show the use of air blasters that inject air through the sidewall of a hopper. The air blasters are mounted on a hopper with the air blasters containing a relatively large volume of air under significant pressure and a quick release valve for suddenly blasting the volume of air directly into the conveyable material. U.S. Pat. No. 4,496,076 shows examples of air blasters mounted to cone of the hopper and with the air blasters directing a blast of air downward or tangentially with respect to the wall of the hopper in order to break up a bridge of conveyable material. This type of device requires a large amount of energy to break up the bridge and has been referred to as the creation of a "dull explosion" in the material.

U.S. Pat. No. 6,007,234 shows a fluid injector that directs air along a surface wall of the hopper to dislodge materials located along the sidewalls of the hopper. This type of device minimizes bridging by inhibiting materials from adhering to the sidewall of the hopper. In this type of apparatus multiple fluid injectors may be mounted in the hopper sidewall to keep material from adhering to the sidewall of the hopper and thus inhibiting bridging.

U.S. Pat. No. 4,826,051 disclose another high energy manifold blaster that attaches to the side of the hopper to pulverize the particulate matter in the hopper so the material can flow through the hopper. Generally, multiple units are mounted in the hopper sidewall.

As can be seen from the above prior art it is difficult to continuously convey bridgeable materials due to the problem of bridging of conveyable materials, which has given rise to numerous methods and apparatus. Some methods employ brute force by shaking the bin or blasting air through a sidewall of the hopper and into the side of the bridged material to break up a bridge while other methods and apparatuses attempt to prevent a bridge of conveyable material from forming in the hopper by directing air along a sidewall of the hopper through a plurality of openings in the sidewall. Compounding the problem of conveyable materials, which may bridge, is that some bridges within the hopper may be broken easily while others are extremely difficult to break up.

The prior methods have certain disadvantages in that some methods may substantially increase noise level proximate the hopper, some may shorten the life of the system, some may require large amounts of energy or some require multiple air blasters or bin aerators mounted to the sides of the hopper, which increases both the complexity and costs of the system. In some cases the prior art methods are simply ineffective and instead of dislodging bridged material an air blaster may form a "rat hole" in the bridged material, which is a passageway from the blaster to the hopper outlet that does not break up the bridge but prevents the bridged material from falling into the hopper outlet.

SUMMARY OF THE INVENTION

A conveying system for smoothly and continually conveying materials from one location to another where the conveyable materials have a tendency to self adhere and form a material bridge of conveyable materials which blocks the flow of conveyable materials through the conveying system. The conveying system includes a source of air that can on the go be intermittingly released into the underside of a bridge of conveyable material to disintegrate the bridge of a conveyable material over a hopper outlet. By directing a pulse or charge of air into an underside of a bridge of normally conveyable material in a gravity hopper in a direction that is opposite to the normal gravitational flow of the conveyable material through the hopper outlet it has been found that one can maintain a continuous flow of conveyable material through the system. In one example an outlet fluid port for the source of air is located below the hopper outlet and in a vertical flow path of material from the hopper outlet with the upward facing fluid port momentarily opening to release a charge or pulse of compressed air directly upward into the hopper outlet. The charge or pulse of air flows upward into and through the hopper outlet and into the underside of bridged particles in the hopper, where the charge of air dissipates into the bridged material, which disintegrates or unlocks the bridged particles from each other causing the bridged material to collapse and fall into the hopper outlet. After release of the charge of air the fluid port closes, which allows the bridged material to fall downward through the hopper outlet and into a conveying system where the material can be transported to a remote location. Since the bridge is quickly broken with a charge or pulse of air from beneath the bridged material no devices need to be mounted to the sidewalls of the hopper and the energy use in breaking the bridge is minimized since a single release of a charge of air into the bottom outlet of the hopper can break up the bridged material in the hopper. Thus, one can maintain a flow of materials through the conveying system since bridged material in the hopper can be quickly broken on the go with an air jet or a release of a pulse of air into the underside of the bridge. In the event a further bridge may form one can repeat the process as needed to keep the material flowing through the hopper outlet by continually supplying pulses or charges of air to the hopper inlet, which may be pulses of air.

BRIEF DESCRIPTION OF THE DRAWINGS

FIG. 4 is a cross sectional view of the conveying system and bridge breaker in the open condition with a butterfly valve located at the inlet; and FIG. 5 is a cross sectional view of the conveying system and bridge breaker in the open condition with a set of bin aerators mounted on the cone wall of the hopper.

DESCRIPTION OF THE PREFERRED EMBODIMENT

Figure 1:
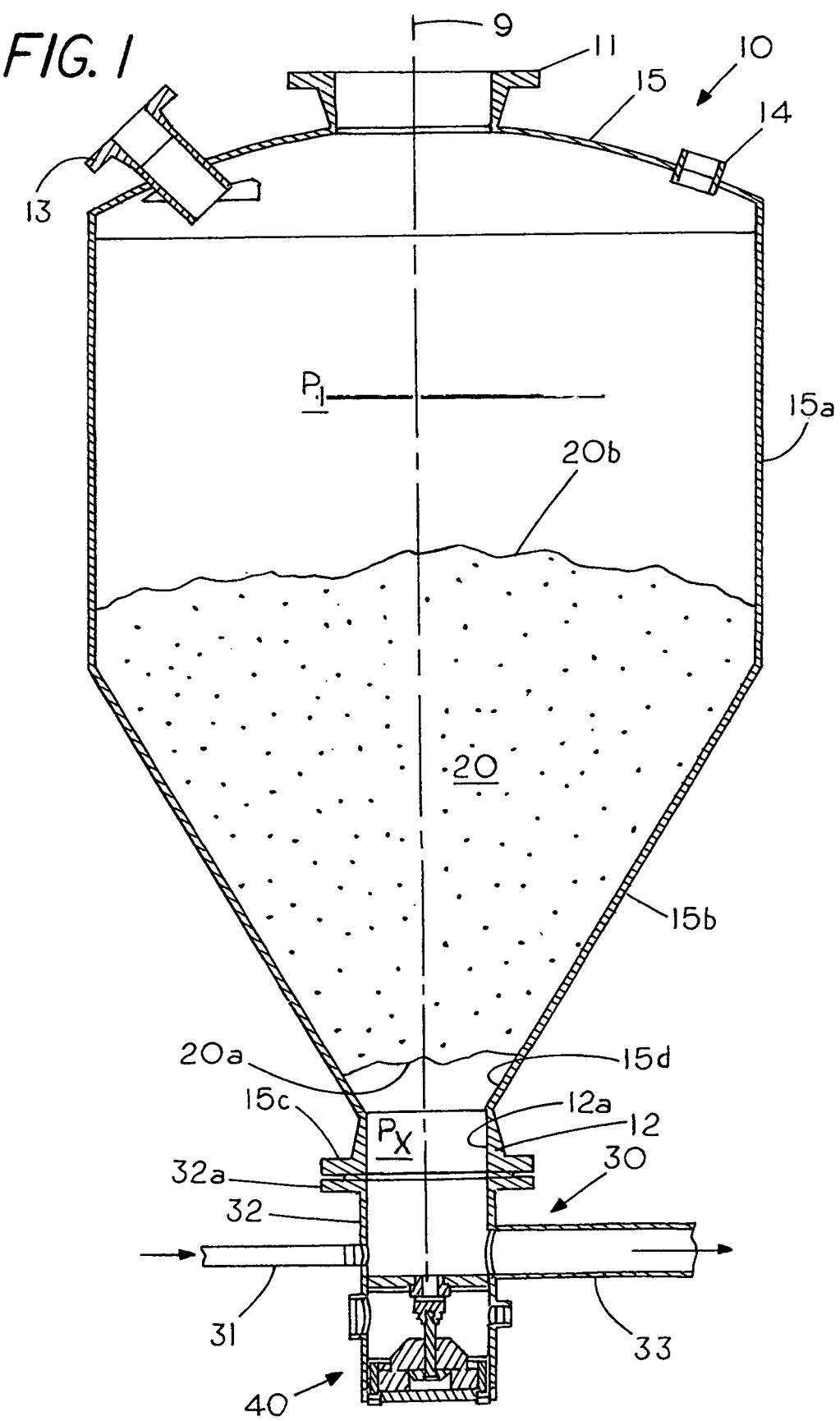
FIG. 1 is a cross sectional view of a gravity hopper for delivery of conveyable material to a conveying system and a bridge breaker.

FIG. 1 shows a cylindrical gravity hopper 10 having a vertical axis 9 extending through a cylindrical hopper inlet 11 located at the top of the hopper and a cylindrical downward facing hopper outlet 12 located at the bottom of the hopper. Hopper 10 includes a domed top 15 with a port 13, a port 14 and hopper inlet 11 located therein. In this example hopper 10 includes a cylindrical sidewall 15a and an intermediate open-ended cone 15b that converges from cylindrical sidewall 15a to a cylindrical hopper outlet 12, which has a cylindrical vertical sidewall 12a for directing material away from and out of the hopper 10. A flange 15c on outlet 12 allows one to secure a conveying system 30 to hopper outlet 12. Typically, one directs a batch of conveyable material into the hopper inlet 11 of the gravity hopper 10 where the conveyable material is gravitationally funneled to the hopper outlet 12 located at the bottom of the hopper 10. The conveyable material discharging from the hopper outlet is then transported to a different location through a conveying system 30, which for example may be a pneumatic conveying system or the like.

A reference to FIG. 1 shows hopper 10 contains a conveyable material 20, which is in contact with the interior surface of frusto conical sidewall 15d with conveyable material 20 forming a self-supporting bridge over the hopper outlet 12 with the bridge having a top surface 20b and an underside 20a. The formation of the bridge through the self-adhesion of conveying material particles to one another prevents normally conveyable material 20 from falling into the pneumatic conveying system 30, which is located below the outlet 20. In this example the pressure $P_1$ on top of the conveyable material is insufficient to force the material 20 through the outlet 12 and increasing the pressure $P_1$ may further compact the bridged material 20 without breaking the bridge. Typically, the bridge of conveyable material 20 has the highest bulk density at the bottom of the bridge than at the top of the bridge since the pressure from the weight of the conveyable material increases the density of the conveyable material, which strengthens the bottom of the bridge, thus requiring large amounts of energy to break up the bridge if one blasts air laterally or downwardly into the bridged material.

A circular flange 32a on conveying housing 32 connects to a circular flange 15c on hopper outlet 12 through bolts or the like to hold the conveying housing 30 proximate the hopper outlet 12. An air inlet 31 connects to one side of housing 32 for supplying conveying air to a conveying pipe 33, which extends from the opposite side of the housing 32. In normal operation the conveyable material 20 falls downward through the hopper outlet 12 and into the conveying housing 32 where the incoming air from air inlet 31 and conveying pipe 33 fluidly transport the conveyable material to another location. In general the conveyable material 20 is transported from the gravity hopper 14 to a remote location through the conveying line 33 as long as the conveyable material remains in a fluidized or flowable state within the hopper. However, from time to time conditions occur in the hopper that cause the normally conveyable material 20 to form a bridge of over the hopper outlet, which stops the flow of conveyable material through the hopper outlet 12. Still in other cases some materials may form bridges so frequently that one simply foregoes the use of a gravity hopper for conveying the materials. FIG. 1 illustrates a typical static bridge of conveyable material 20, which has a top surface 20b and a bottom or underside 20a that has been formed into a solid bridge that extends from side to side of the hopper thus preventing the conveyable material 20 in hopper 10 from falling into the hopper outlet 12.

Figure 2:
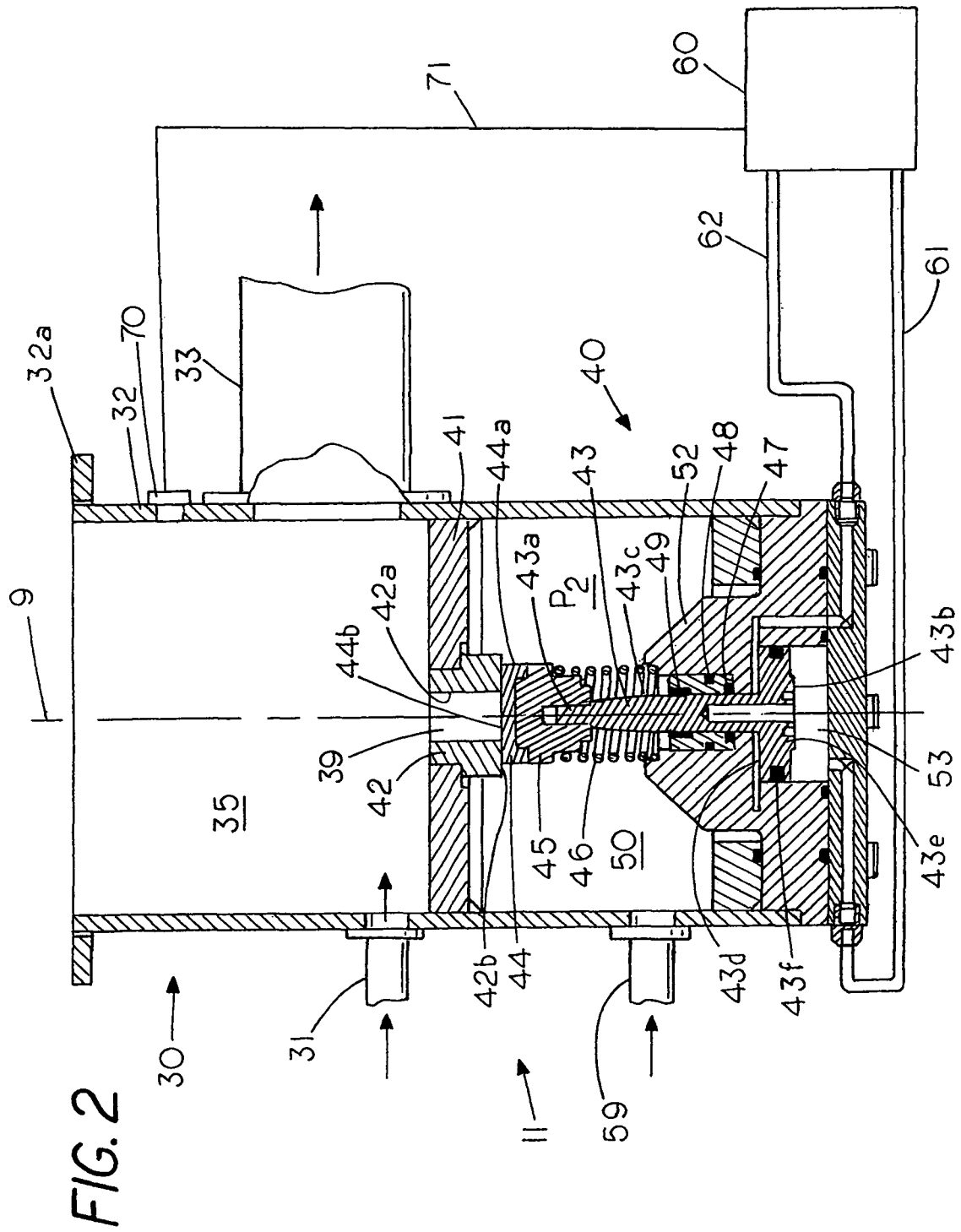
FIG. 2 is a cross sectional view of the conveying system and bridge breaker in the closed condition.

As shown in FIG. 1 and FIG. 2 the conveying system 10 includes a gravity hopper 10 having a hopper outlet 12 for gravitationally directing a conveyable material 20 downward into the hopper outlet 12 where it is received in a conveying chamber 35 which can carry the material to a further location. Located directly below the hopper outlet 12 is an upward facing fluid port 39 for on the go directing of a pulse of air vertically upward into and through the downward facing hopper outlet 12 and into an underside of a bridge of conveyable material 20, which is located over the hopper outlet 12. The release of a short pulse or a small charge of air upward into the hopper outlet and into the underside of the bridge causes a disintegration of the bridge of conveyable material that starts from below the bridge of conveyable material and thus requires a minimum of energy as opposed to high energy methods of blasting air into the top or side of the bridged material, which in some cases may not even break up the bridge but form "rat holes" through the material.

FIG. 2 is an isolated view of a conveyer 30 and one example of a bridge breaker 40 sharing a common vertical, cylindrical, sidewall 32, which includes a top flange 32a for attachment to a flange 15c on the bottom of hopper outlet 12 through bolts or the like. In this example housing sidewall 32 forms a common vertical sidewall for both the conveyer 30 and bridge breaker 40 although if desired the bridge breaker may be separate from the conveyor system 30 or may be used without a conveyor system. In this example a disk member or separator 41, which is secured to inner cylindrical sidewall 32, separates the conveyor system 30 from the bridge breaker 40 with the disk 41 having a fluid port 39 that can be opened or closed in response a need to break up a bridge or prevent a bridge from forming in the hopper 10.

FIG. 2 shows bridge breaker 40 in a closed condition where a material receiving chamber or conveying chamber 35 in the conveyer 30 is isolated from a bridge breaker air chamber 50 in the bridge breaker 40. In this example, bridge breaker 40 includes a slideable piston or retractable plug 43 having a central shaft 43c, a first end 43a in engagement with the retractable plug including a rigid collar 45 that engages a compression spring 46 and a second end 43e with piston 43 having a top face 43d and a bottom face 43b. A slideable seal 43f extends around the periphery of the second end 43e to form a seal between the chamber 53 above the top face 43d and the chamber 53 below the bottom face 43b. Annular seal 49 and annular seal 47 permit axial sliding of central shaft 43c, while annular seal 48 forms a seal between base 52 and base collar 51. In this embodiment the compression spring 46 engages the retractable plug 43 for quickly urging the retractable plug into a closed condition after a portion of the air in the air chamber has been released through the fluid outlet port 39.

A resilient cap 44 on the top end of piston 43 includes a circumferential lip 44a that extends over collar 45 with a top face 44b forming sealing engagement with the underside 42b of collar 42 to prevent air flow therethrough when in the closed condition. That is, the axial pressure generated by compression spring on piston 43 maintains fluid port 39 in a normally closed condition in the absence of a control pressure from control station 60 as compression spring 46 biases piston 43 toward a closed condition that sealingly closes the top fluid port 39 to prevent a conveyable material from falling into the chamber 50. In some instance rapidly closing the fluid port 39 can be used to prevent fluid from falling into the fluid port or one may maintain a flow of air through the top fluid port sufficient to deflect conveyable material away from the fluid port without actually blocking the fluid port 39 or interfering with the material falling into chamber 35. As described herein control station 60 can open and close the air outlet or fluid port 39 to deliver either a pulse of air, a series of pulses of air or a continual flow of air into the hopper outlet.

Collar 42 includes a central passage or fluid port 39 formed by sidewall 42a, which connects to the conveyor air chamber 35 in conveyor 30. In the closed condition shown in FIG. 2 the lower air chamber 50 in bridge breaker 40, is isolated from the top conveying air chamber 35 by resilient cap 44, which prevents flow therebetween.

FIG. 2 shows bridge breaker 40 includes an air chamber 50, which is supplied with pressurized air through an air inlet 59. Located within the base of chamber 50 is a base collar 52 having a vertical displaceable piston 43 therein. In operation chamber 50 receives and stores a pressurized gas from air inlet 59 with the source of pressurized air having a stagnation air pressure greater than an air pressure in the hopper outlet 12 so that a release of air from chamber 50 can be directed upward through the chamber 35 and into the hopper outlet 12 during the operation of the conveying system.

Figure 3:
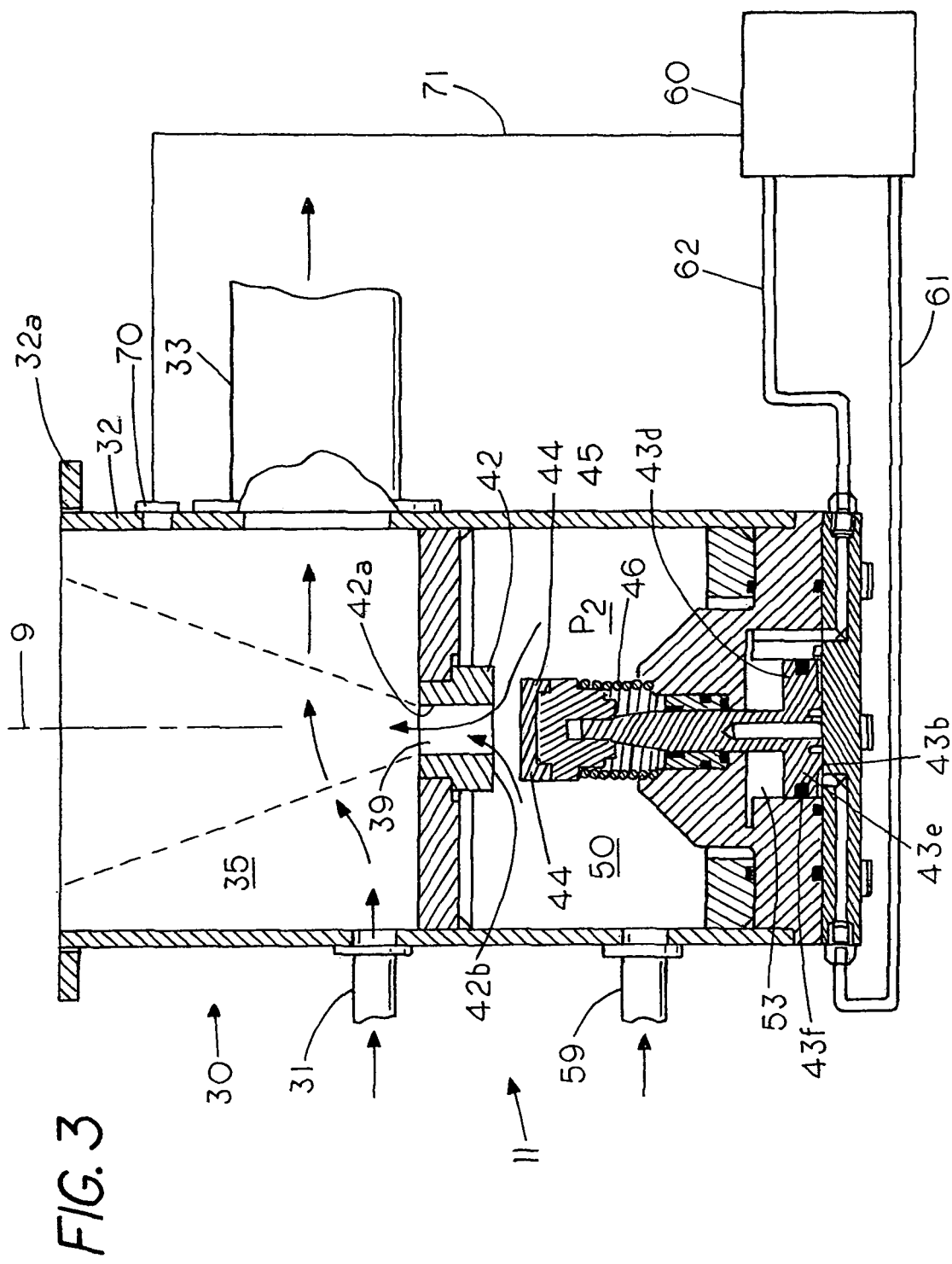
FIG. 3 is a cross sectional view of the conveying system and bridge breaker in the open condition.

Cylindrical housing 32 includes a top member 41 having a top fluid port 39 that opens vertically upward into the hopper fluid outlet 12 as the fluid port 38 is positioned directly below the gravity hopper flow outlet 12 with the top fluid port 39 shown positioned in a vertical flow path of material discharging from hopper 10 as indicated by a vertical axis 9. Piston 43 is axially and vertically slideable with piston 43 having a top end 44 movable from a closed condition, which is shown in FIG. 2, where the top fluid port 39 is in a closed condition to prevent flow therethrough to an open condition, which is shown in FIG. 3, where the top fluid port 39 is in an open condition so that a charge of pressurized air released from the chamber 50 flows upward through the top fluid port 39, the hopper outlet port 12 and into the bridge underside 20a to thereby disrupt and disintegrate the bridge, which allows the material 20 forming the bridge to fall downward through the hopper outlet 12 and into the material conveying chamber 35 where it can be transported to a different location by the conveying member 30.

In this example a control station 60 connects to a top portion of a piston chamber 53 through a first conduit 62 that supplies a control fluid such as air to a topside 43d of piston 43 in piston chamber 53. Similarly, control station 60 has a second conduit 61 that connects to a bottom portion of piston chamber 53. Control station 60 may be manually operated or may be automatically operated to supply the control fluid needed to slide piston 43 up or down to open or close the port 39 between conveying system 30 chamber 30 and bridge breaker air chamber 50.

Upon detection of a bridge in hopper 10 a signal is sent from control station 60 to slide piston 43 downward, which opens the fluid port 39 and automatically releases a charge of air from air chamber 50 into the hopper outlet 12, where the charge of air flows upward into the bridge bottom 20a to break up the bridged material in the hopper 10. After release of the charge of pressurized air a further signal is sent to slide the piston 43 upward to close the outlet port 39 so the bridged material can fall into the hopper outlet 12 and be delivered to the conveying system 30 rather than falling into port 39. In addition the force of compression spring 46 may be set such that it closes port 30 when the charge of air escaping from the air chamber is reduced in air chamber 50. As can be seen the invention comprises a bridge breaker for a gravity hopper having a downward facing hopper outlet and a source of air with the source of air having an upward facing outlet in alignment with the downward facing hopper outlet for directing a charge of air from the source of air vertically upward into the hopper outlet to disrupt or prevent blockage of flow of a conveyable material through the hopper outlet.

A feature of the invention is that the delivery of a charge of air on the go, which is directed vertically upward into the hopper outlet 12 and into the underside 20a of a material bridge, requires less energy to break up a bridge in the hopper then conventional blasters or bin vibrators. The air pressure $P_2$ in the chamber 50 for breaking the bridge may be equal or less than the air pressure $P_1$ on top of the bridge as the bridged material forms an air seal between the top and bottom of the hopper. FIG. 1 shows that the pressure $P_1$ above the bridge is not generating sufficient force to push the bridged material into the outlet 12. However, the release of a small charge of air from air chamber 50, where the stagnation pressure $P_2$ may be equal or even less than the pressure $P_1$, is sufficient to break up the bridged material through engagement with the bridge underside 20a. For example, it has been found that momentarily releasing a charge of air, from air chamber 50, which is at stagnation pressure $P_2$ which is equal or less the pressure $P_1$, into the hopper outlet 12 and the underside of the bridge dislodges or loosens the bridge particles at the bottom of the bridge, which causes the bridge to collapse allowing the conveyable material 20 in the hopper to flow through the hopper outlet 12. Thus, in the invention described herein the air does not need to be blasted into the bridged material in order to force the particles into the hopper outlet. That is, where the prior art forces the particles laterally or toward the hopper outlet the present invention momentarily directs a charge of air upward into the hopper outlet and into the underside 20a of the bridge, which causes the bridged particles to disintegrate and fall downward into the hopper outlet 12. The momentary on the go delivery of a charge or pulse of air to dislodge the bridged material from beneath the bridge can be done quickly, quietly and efficiently with minimum energy consumption so that the conveying can continue without interruption.

In the example shown a flow sensor 70, which is located in the conveyor sidewall 32 can be used to detect the presence of flow into the conveyor. For example flow sensor may be a conventional optical sensor, which senses the presence or absence of materials flowing through the conveying system. If no flow is detected in conveying chamber 35 control station 60 receives a no flow condition and automatically sends a signal to retract piston 43, which causes the cap 44 to move downward and unblock port 39 thus releasing a charge of air from chamber 50, which flows upward into the bridge underside 20a. The contact of the pulse or charge of air with the underside of bridged material quickly breaks the bridged material, which allows the bridged material to flow into the conveying chamber 35. Conversely, if the flow sensor 70 determines that the conveyable material is flowing control station 60 maintains the piston or retractable plug 43 in the closed condition as shown in FIG. 2.

In this example the conveying system includes a housing 32 having an integral air chamber 50 for holding air at a stagnation pressure, which is in excess of an air pressure $P_x$ on the underside of the bridge of conveyable material. A fluid port 39 in the housing releases a portion of air from the air chamber 50 into the hopper outlet 12 without allowing a dynamic air pressure $P_x$ in the conveying chamber 35 and the air pressure in the chamber 50 to equalize, which could prevent flow through the conveyor. However, other methods of releasing a charge of air may be used without departing from the spirit and scope of the invention.

As described herein the invention includes an on the go method for maintaining the flow of conveyable material through a gravitational hopper 30 with the method of conveying material from a gravity hopper 10 comprising the steps of directing a conveying material 20 into a gravity hopper 10, gravitationally directing the conveying material downward into a hopper outlet 12, conveying the material 20 away from the hopper outlet 12 and directing a pulse of air upward into the hopper outlet 12 in the event the conveyable material stops flowing through the hopper 10.

A feature of the method is that even though the pulse or charge of air is directed vertically upward into a bridged region of the conveyable material where a bulk density of the conveyable material is highest the bridged material can be quickly broken to allow material to flow through the hopper outlet. Depending on the pressures in some instances the pulse of air may travel as a shock wave into the hopper outlet 12.

During the conveying of material in the conveying system of the invention described herein one normally maintains an air pressure on a topside of conveyable material $P_1$ at proximately the same as an air pressure $P_x$ on the underside of the conveyable material through a periodic directing of the pulse of air upward into the hopper outlet 12 and opposite to a gravitational flow direction of the conveyable material from the hopper outlet 12. One method of providing air for directing into the hopper outlet is to maintain a source or air in a chamber 50 where a stagnation pressure of the air in a chamber 50, which connects to the hopper outlet 12, is maintained at a pressure greater than the air pressure $P_x$ in the hopper outlet.

In this method one preferably directs the pulse or charge of air from chamber 50 vertically upward into the hopper outlet 12 while there is no downward flow of conveyable material through the fluid outlet 12. Typically, the pulse of air released from an air chamber, which has a stagnation pressure greater than an air pressure in a conveying outlet connected to the fluid outlet, quickly flow into and through the conveying chamber 35 and into the hopper outlet. That is, a pulse or charge of air released into the hopper outlet 12 flows upward directly into particles on an underside 20a of the bridged region of conveyable material 12 in the hopper 10, which breaks up the bridge on the go.

During the conveyance of materials 20, which may either dry or wet, the conveyable material begins to consolidate and compact as the materials enter the gravity hopper 10 resulting in the bulk density of the conveyable material being at its highest near the hopper outlet 12, which is located at the bottom of the hopper 10. In addition, the longer the material 20 sits in the gravity hopper 10 the more the material consolidates and compacts in the hopper, which increases the difficulty in dislodging the material 20 from the hopper 10.

Increasing the downward forces on the material 20 at the top of the hopper 10 either by adding more material or increasing the air pressure $P_2$ may be counter productive as the increased pressure squeezes or compacts the material, which makes it more difficult for the conveyable material to flow out of the hopper under the force of gravity. The consolidation or compaction of material 20 at the lower cone section above the hopper outlet 12 is a major problem to gravity feeding of most materials as the material may squeeze together and compact into an unflowable condition in response to upstream pressure on the materials 20.

The material at the top of hopper 10 has the lowest bulk density and as material 20 is added to the top of the hopper 10 it increases the weight on the material at the bottom of the hopper, which in some cases squeezes the material at the bottom of the hopper to the point of being rock hard and resistant to gravity flow. Consequently, The material at the bottom of the hopper, which is compacted together, has a much higher bulk density that any material located above the bottom of the hopper. As a result it has been found it becomes more difficult if not impossible to dislodge and gravity feed materials through the hopper outlet at the bottom of the hopper if the materials forms a bridge over the hopper outlet. Consequently, the lodging or bridging of material in the cone of the hopper 10 may become so compacted that even devices that blast air through ports in the side of the cone wall 15b may fail to dislodge the material from the hopper 10. Likewise increasing air pressure $P_2$ at the top of the hopper in order to force the material through the hopper outlet 12 has the effect of squeezing or compacting the material in the lower cone of the hopper 10 thus making it more difficult to convey materials through the hopper.

A feature of the invention described herein is that materials, which are normally extremely difficult or may be impossible to gravity feed, can be conveyed through and from the hopper 10.

FIG. 4 shows a cross sectional view of hopper 10 with an inlet 12 and a butterfly valve 80 for opening and closing the pressurized inlet pipe 81. The system of FIG. 4 is identical to the system shown in FIG. 1 except a butterfly valve 80 is used to open and close the supply pipe 82 to the hopper 10. Suitable butterfly valve are shown and described in applicant's U.S. Pat. Nos. 4,836,499; 5,295,659 and 8,256,448 and are hereby incorporated by reference. In this example the conveyable material 20 under pressure flows through pipe 81, butterfly valve 80 and inlet 82 and then flows downward as identified by 20d onto the material top 20b of material 20. Located below the hopper outlet 12 is the bridge breaker 40 that contains a charge of air for directing upward into the outlet and into the underside of the bridge where some of the air may flow upward along the sides of the hopper 10. While a butterfly valve is shown a ball valve or any other type of valve may be used so that the hopper can be pressurized to normally push or convey material through the hopper and to its intended destination.

FIG. 5 shows a system identical to the hopper 10 in FIG. 1 and FIG. 4 except in this application a set of fluid injector or bin aerators 85 and 86 are located on the cone wall 15b to provide an option for dislodging or aerating materials in the hopper. Bin aerators 85 and 86 may be used independent or in conjunction with bridge breaker 40 depending on the material being conveyed. An example of a bin aerator is shown in applicants U.S. Pat. No. 3,952,956, which is hereby incorporated by reference. In the example shown in FIG. 5 compressed air is supplied to cone sidewall though air pipe 86a and bin aerator 86 as well as through air pipe 85a and bin aerator 85.

A further feature of the invention described herein is that the bridge breaker 40, which operates through the hopper outlet 10, is compatible with existing systems. That is, directing a charge of compressed air upward into the bridged material in the hopper 10 to dislodge bridged material from below so the material can feed out of the hopper outlet 12 may be incorporated into existing conveying systems even if other devices are maintained on the hopper since the bridge breaker can be maintained outside the hopper and can operate independently of the operation of other devices attached to the hopper 10.

Another feature of invention of directing a charge of compressed air upward though the hopper outlet 12 is the sidewall cleaning benefit obtained during the emptying of the hopper when there may be no bridging in the hopper. Normally, as the material empties out of the gravity hopper 10 some material may adhere to the sidewall of the hopper. With the present invention one can quickly remove any residue material that may be adhering the hopper walls as the charge of air entering through the hopper outlet 12 travels upward through the hopper 10 where it sweeps along the conical hopper walls 15b, which loosens any remaining material that may be adhered to the walls thereto thereby enabling a complete emptying of the hopper.

The conveying system has been described herein with a single release of a charge a pulse of air or a continually release of charges or pulses of air that are directed upward into the hopper outlet, however, as an alternate embodiment a continuous upward stream of air, which is either a variable velocity stream of air or a constant velocity stream of air, may be introduced into the bottom of the hopper outlet to maintain difficult materials in a flowable condition. In the continuous flow application the upward flowing air jet may be sufficiently small so as not to block the downward flow of conveyable material into the hopper outlet but sufficiently large to maintain the material in the hopper outlet in a fluidized condition by breaking or preventing bridges from forming in the hopper outlet. In this application either the momentum of the falling conveyable material in the hopper can be used to overcome the upward force of the continuous jet or the continuous flow jet may have a smaller diameter than the hopper outlet so that both an upward flow of air into the hopper and a downward flow of material from the hopper can coexist in the same passage.

While the system has been described as to use of air no limitation is intended thereto as the air may be a single gas or various combinations of gases, which are suitable for the conveying of bridgeable materials.

I claim:

1. The method of conveying material from a gravity hopper comprising the steps of; directing a conveyable material into a port in the gravity hopper; gravitationally directing the conveyable material downward into a converging bin located at the bottom of the gravity hopper; conveying the conveyable material away from a gravity hopper outlet; momentarily directing a stream of air upward into the gravity hopper outlet; and normally maintaining an air pressure on a topside of the conveyable material in the gravity hopper at proximately the same as an air pressure on the underside of the conveyable material in the gravity hopper through directing a stream of air upward into the gravity hopper outlet and opposite to a gravitational flow direction of the conveyable material from the gravity hopper outlet.

2. The method of claim 1 wherein the stream of air is a pulse of air which is directed upward through a fluid port into a bridged region of the conveyable material in the gravity hopper where a bulk density of the conveyable material is highest.

3. The method of claim 2 where the pulse of air travels as a shock wave through the fluid port into the gravity hopper outlet.

4. The method of claim 1 wherein a stagnation pressure of air in a chamber connected to the gravity hopper outlet is maintained at a pressure greater than the air pressure in the gravity hopper outlet.

5. The method of claim 4 wherein the pressure of the air in the chamber in the converging bin of the gravity hopper is maintained at a pressure lesser than an air pressure above a bridge of conveyable material in the bottom of the gravity hopper but greater than an air pressure in the gravity hopper outlet.

6. The method of claim 5 including directing the pulse of air vertically upward into the gravity hopper outlet while there is no downward flow of conveyable material through the gravity hopper outlet.

7. The method of claim 6 wherein the pulse of air is released from an air chamber having a stagnation pressure greater than an air pressure in a conveying outlet connected to the gravity hopper outlet.

8. The method of claim 7 wherein the stagnation air pressure in the chamber is greater than the air pressure in a conveying chamber below the gravity hopper outlet so the air released into the gravity hopper outlet flows upward into an underside of the bridged region of conveyable material in the gravity hopper.

9. The method of claim 1 including the step of directing the air through the gravity hopper outlet during a hopper emptying phase to remove material that may be adhered to a sidewall of the gravity hopper but not bridged over the gravity hopper outlet.

10. The method of claim 1 including the step of maintaining an above atmospheric pressure in a chamber in the gravity hopper by directing the material into the gravity hopper through a butterfly valve on an inlet of the gravity hopper and directing the air upward through the gravity hopper outlet while the above atmospheric pressure is being maintained in the inlet of the gravity hopper.

\* \* \* \* \*